United States Patent
Rabinovitch

(10) Patent No.: US 7,697,418 B2
(45) Date of Patent: Apr. 13, 2010

(54) METHOD FOR ESTIMATING THE FAN-IN AND/OR FAN-OUT OF A NODE

(75) Inventor: Peter Rabinovitch, Kanata (CA)

(73) Assignee: Alcatel Lucent, Paris (FR)

( * ) Notice: Subject to any disclaimer, the term of this patent is extended or adjusted under 35 U.S.C. 154(b) by 819 days.

(21) Appl. No.: 11/450,348

(22) Filed: Jun. 12, 2006

(65) Prior Publication Data

US 2007/0286085 A1 Dec. 13, 2007

(51) Int. Cl.
*H04J 3/14* (2006.01)
*H04L 12/26* (2006.01)
*G06F 7/04* (2006.01)
*G06F 15/173* (2006.01)

(52) U.S. Cl. .................. 370/218; 370/235; 370/244; 709/224; 726/26

(58) Field of Classification Search ........... 370/218, 370/235, 244; 709/224; 726/26
See application file for complete search history.

(56) References Cited

U.S. PATENT DOCUMENTS

| | | | | |
|---|---|---|---|---|
| 7,535,909 | B2 * | 5/2009 | Singh et al. ............. | 370/395.1 |
| 2002/0133586 | A1 * | 9/2002 | Shanklin et al. .......... | 709/224 |
| 2003/0105976 | A1 * | 6/2003 | Copeland, III ........... | 713/201 |
| 2004/0054925 | A1 * | 3/2004 | Etheridge et al. ......... | 713/201 |
| 2004/0193943 | A1 * | 9/2004 | Angelino et al. .......... | 714/4 |
| 2005/0018618 | A1 * | 1/2005 | Mualem et al. .......... | 370/252 |
| 2006/0010389 | A1 * | 1/2006 | Rooney et al. ........... | 715/736 |
| 2006/0077905 | A1 * | 4/2006 | Russell et al. ........... | 370/252 |
| 2006/0230167 | A1 * | 10/2006 | Watanabe et al. ........ | 709/230 |
| 2007/0115850 | A1 * | 5/2007 | Tsuchiya et al. ......... | 370/252 |
| 2008/0028467 | A1 * | 1/2008 | Kommareddy et al. .... | 726/23 |
| 2008/0271146 | A1 * | 10/2008 | Rooney et al. ........... | 726/23 |
| 2008/0307524 | A1 * | 12/2008 | Singh et al. ............. | 726/22 |
| 2009/0232000 | A1 * | 9/2009 | Watanabe et al. ........ | 370/235 |

OTHER PUBLICATIONS

Whang, A Linear-Time Probabilistic Counting Algorithm for Database Applications, Korea Advanced Institute of Science and Technology, 1990, pp. 208-229.

Durand, et al., Loglog Counting of Large Cardinalities, Springer-Verlag Berlin Heidelberg, 2003 pp. 605-617.

Vankataraman, et al., New Streaming Algorithms for Fast Detection of Superspreaders, Computer Research Dept., Carnegie Mellon University, May 2004, pp. 1-24.

* cited by examiner

*Primary Examiner*—Alpus H Hsu
(74) *Attorney, Agent, or Firm*—Kramer & Amado, P.C.

(57) ABSTRACT

A method for detecting anomalies in traffic patterns and a traffic anomalies detector are presented. The method and the detector are based on estimating the fan-in of a node, i.e. the number of distinct sources sending traffic to a node, based on infrequent, periodic sampling. Destinations with an abnormally large fan-in are likely to be the target of an attack, or to be downloading large amounts of material with a P2P application. The method and the anomalies detector are extremely simple to implement and exhibit excellent performance on real network traces.

17 Claims, 3 Drawing Sheets

METHOD FOR ESTIMATING THE FAN-IN AND/OR FAN-OUT OF A NODE

FIELD OF THE INVENTION

The invention is directed to communication networks and in particular to a method for estimating traffic anomalies at a node of a communication network.

BACKGROUND OF THE INVENTION

Detailed visibility into individual users and business applications using the global network is essential for optimizing performance and delivering network services to business users. In general, current network monitoring tools are able to collect a large amount of data from various information sources distributed throughout the network. For example, Snort Intrusion System for TCP (SIFT), uses an information dissemination server which accepts long-term user queries, collects new documents from information sources, matches the documents against the queries, and continuously updates the users with relevant information. SIFT is able to process over 40,000 worldwide subscriptions and over 80,000 daily documents.

Also, tracking and monitoring traffic in communication networks is particularly relevant for network vendors who wish to provide access to information on their high-end routers; they must therefore devise scalable and efficient algorithms to deal with the limited per-packet processing time available. Traffic monitoring tools are also useful to network providers, as it allows them to filter information relevant to implementing cost saving measures by optimizing network resources utilization, detecting high-cost network traffic, or tracking down anomalous activity in a network, etc. For example, in order to protect their network and systems today, network providers deploy a layered defense model, which includes firewalls, anti-virus systems, access management and intrusion detections systems (IDS). The capacity to detect as fast as possible the propagation of malware and to react efficiently to on-going attacks inside the network in order to protect the network infrastructure is becoming a real challenge for network operators.

Network performance monitoring mechanisms need to perform traffic analysis in a non-invasive way with respect to the observed networking environment. Detecting attacks and point-to-point traffic is a huge problem for network managers in order to better utilize and protect their networks. Providing information that may help them to do this with minimal cost may be a key differentiator between the services a network may offer to users.

From security point of view, a relevant metric to detect malware is to determine the number of distinct sources sending traffic to a monitored destination, referred to as "node fan-in". Destinations with an abnormally large fan-in are likely to be the target of an attack, or to be downloading large amounts of material with a point-to-point application (e.g. BitTorrent). This is equivalent to determining the sources with the highest fan-out (number of distinct destinations from the source), by interchanging the roles of source and destination; this is known as "node fan-out". Sources with an abnormally large fan-out may be attempting to spread a worm or virus.

Some of the tools used today for establishing the node fan-in or fan-out perform monitoring of all packets arriving at a node. These tools require that the respective node be equipped with sophisticated hardware/software for packet inspection at high speed. In addition, these tools require a large amount of memory for maintaining the tables with destination/source information for each packet. Evidently, looking at every packet arriving at a node is not practical for large traffic volumes and nodes that are not equipped with sophisticated, expensive hardware component.

Other current methods of traffic monitoring are for example "linear counting" (described by Whang, K.-Y., Zanden, B. T. V., and Taylor, H. M. in "A linear-time probabilistic counting algorithm for database applications"), or "loglog counting" (see details at http://algo.inria.fr/flajolet/Publications/DuFI03-LNCS.pdf), or "Superspreader algorithms" (see details at http://reports-archive.adm.cs.cmu.edu/anon/2004/CMU-CS-04-142.pdf), to list the most relevant. However, all these tools and algorithms have a number of drawbacks that dissuade their use on a large scale: they do not necessarily work with sampled data, are complicated, and require extensive additional programming.

A need has arisen for both the users and network operators to have better mechanisms to monitor network performance, filter network traffic, and troubleshoot network congestion, without introducing any additional traffic on the communication network. This is especially relevant to Internet providers that must comply with SLAs (Service Level Agreements) provided to customers. As Internet architecture evolves, the SLAs now include requirements on the quality of service such as jitter, throughput, one-way packet delay, and packet loss ratio. Additionally, the need to monitor network traffic is prevalent for the underlying Internet protocol enabling the World Wide Web.

In particular, there is a need to provide a tool for estimating the destinations with the highest fan-in and/or sources with the highest fan-out that operate with high accuracy and provide instant feedback. Such tools need also to operate in high-speed routers at line speed, without the need of additional complex HW/SW at the network nodes. There is also a need to provide a solution that is extremely simple to implement and exhibits excellent performance on real network traces.

SUMMARY OF THE INVENTION

It is an object of the invention to provide a method for identifying, within a communication network, the destinations with the highest fan-in, or the sources with the highest fan-out.

It is another object of the invention to provide a fan-in/fan-out method that is simple to implement, works well with sampled data, and does not require equipping the network nodes with complex additional software applications or sophisticated equipment.

Accordingly, the invention provides a method of monitoring traffic for tracking anomalous activity in a data packet network, comprising: a) selecting an observation point in the network; b) at the observation point, sampling over a predetermined time window T, every n-th data packet, for determining the source address and destination address of the sampled packet; and c) determining one of: a fan-in count for each destination address seen at the observation point, a fan-out count for each source address seen at the observation point and both a fan-in and a fan-out count for each destination and respectively source addresses seen at the observation point.

The invention is also directed to a traffic anomalies detector for tracking anomalous activity in a data packet network; comprising: a sampling unit for sampling every n-th data packet seen by the detector over a predetermined time window; an address resolving processor for determining the source address and destination address of each the sampled packet; and storing means for maintaining one of a fan-in count for each destination address identified by the address resolving processor, a fan-out count for each source address identified by the address resolving processor, and both a fan-in and a fan-out count for each destination and respectively source addresses.

Detecting attacks and P2P traffic is a huge problem for network managers. Therefore, information that may help detecting malware patterns may be very useful as it will enable the network managers to better utilize and protect their networks. Advantageously, the method of the invention enables identification of traffic anomalies with a high probability, even in networks equipped with high-speed routers, and provides almost instant feedback on possible malware.

Another advantage of the invention is that it provides a solution that is extremely simple to implement, does not require additional complex HW/SW at the network nodes, and exhibits excellent results on real network traces.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

As indicated above, the invention provides a method for identifying traffic anomalies based on estimating the fan-in at network nodes, i.e. the number of distinct sources sending traffic to a node. Destinations with an abnormally large fan-in are likely to be the target of an attack (e.g. a large D/DoS attack on the node, or a worm in progress), or to be downloading large amounts of material with a P2P application, such as illegal copying of video content. Traffic anomalies may equally be identified based on the estimated fan-out at network nodes, by interchanging the roles of source and destination. A high fan-out at a node will identify a worm propagating from that node or the source of a P2P download. In the following, we will refer to these two traffic patterns identified by the instant method collectively as "malware", even if P2P traffic may not necessarily indicate an attack on the respective node/user. Also, in this specification, the invention is described for fan-in estimation; fan-out is analogous.

Figure 1A:
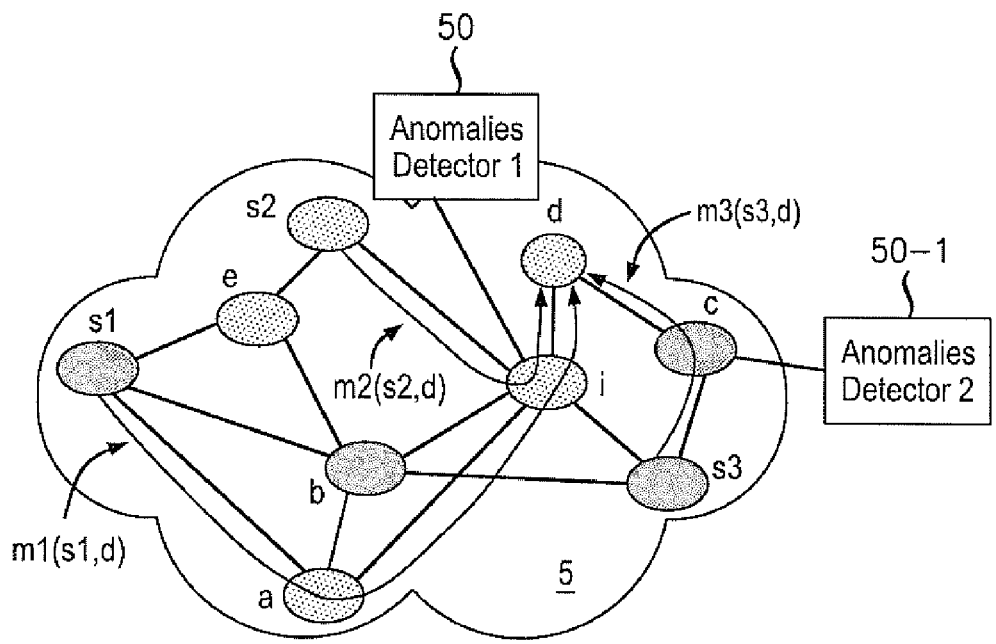
FIGS. 1A and 1B show examples of how fun-in and respectively fan-out can be measured in an communication network.
Figure 1B:
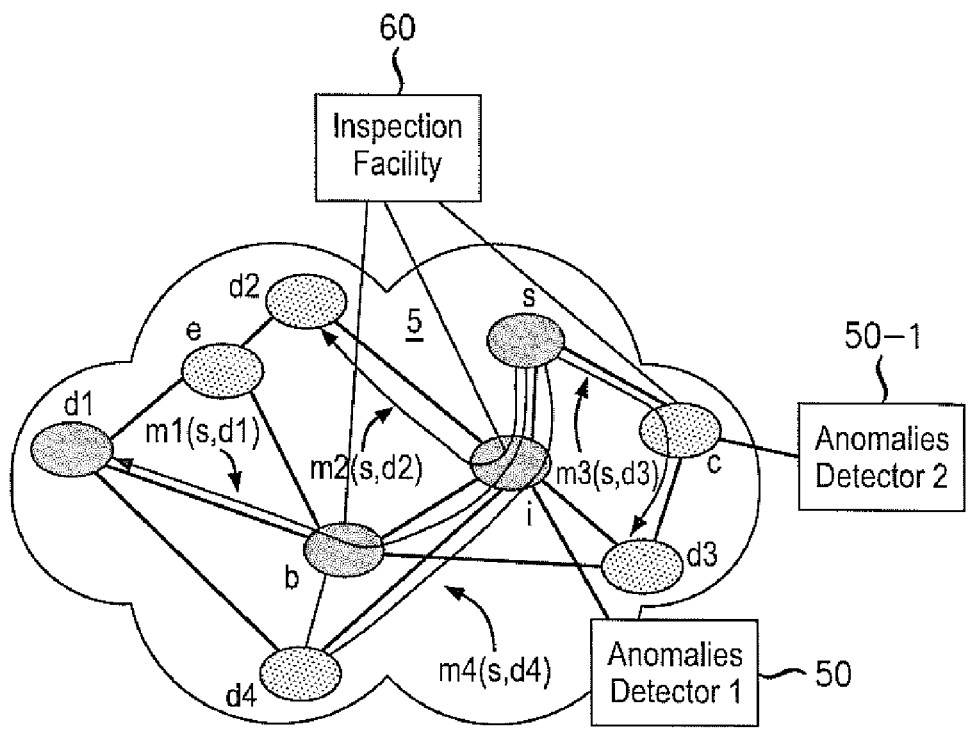

Let's consider a network 5 where a plurality of nodes communicate between them as shown in FIGS. 1A and 1B by way of example. We will use the term "message" for a packet flow established between a source node and a destination node. As well known, each packet of such a flow comprises in the header the source and destination addresses. In the simplistic example of FIG. 1A, three sources s1, s2 and s3 transmit messages to a destination d; message m1(s1,d) is shown between source node s1 and destination node d, m2(s2,d) is transmitted from source s2 to the same destination d, and m3(s3,d) originates at source s3 for destination d. FIG. 1A further shows intermediate nodes a, b, c, e, and i. At a particular observation point in the network, for example at the node denoted with i on FIG. 1A, we consider the population of messages which travel along all network paths containing the observation point, between any source s and destination d, during a certain interval of time.

The fan-in of an address (address d in this example) is defined as the number of different nodes (sources s) that send at least one message to address d from the observed message population. In order to observe the messages with destination d, one or more nodes are provided with anomalies detectors according to the invention. In this example, an anomalies detector 50 connected at node i will detect and count message m1(s1,d) and message m2(s2,d). As such, fan-in of destination address d measured at observation point i is Fanin(d),i=2, since detector 50 measures two messages with this destination. It is apparent that not all messages for node d pass over the observation point i. If an additional anomalies detector 50-1 is provided at node c, a third message with destination d will be detected at this node, so that Fanin(d),c=1. The partial fan-in measurements from nodes i and c can be aggregated to obtain the fan-in for destination d. In this example, Fanin(d)=2+1=3.

Similarly, the fan-out of an address is defined as the number of different nodes which receive at least one message from address s from the observed message population. FIG. 1B illustrates how the fan-out of an address s, denoted with Fanout(s) may be determined according to the present invention. FIG. 1B shows a source node s; destination nodes d1, d2, and d3; and intermediate nodes b, c, i, and e. In this example, source s transmits messages m1(s,d1) to m4(s,d4) to four different destinations d1-d4. Messages m1(s,d1), m2(s,d2) and m4(s,d4) are measured (observed) at node i, so that the partial fan-out of address s observed at node i is Fanout(s),i=3. Node c observes another message m3(s1,d3) so that the partial fan-out for address s observed at node c is Fanout(s),c=1. In this simplistic example, the fan-out of address s, Fanout(s)=4. The partial measurements from all or some of the anomalies detectors may be collected and aggregated at the network management system NMS (if available) or at an inspection facility, as shown in FIG. 1B at 60.

The anomalies detector 50 of the invention is designed to be simple enough to require a short number of operations on every sampled message so that these operations can be implemented in a slow memory access time environment and can be used for monitoring traffic at a network monitoring point where the incoming traffic rate is very large. As a result, the traffic anomaly detector may be used in places where processing resources are scarce, as a first line of anomaly detection. For example, it may be used at a node to allow basic detection of malware, or to establish if a certain flow should be sent to more sophisticated applications for a further in-depth inspection. In this later case, the traffic anomaly detector may be provided on a DPI (deep packet inspection) card present at the respective node, and then appropriate actions can be taken for the respective flow (filtering, etc).

The inspection facility 60 could also be provided on a DPI card on one of the nodes, or could be an application running on a NMS. This will allow more efficient use of processing resources by pre-filtering the traffic for the entire network based on information collected from a selected number of individual nodes.

It is evident that the accuracy of the Fanin(d) or Fanout(s) measurement increases with the number of observation points, which means that more nodes may be equipped with anomalies detectors 50. FIG. 1B shows an example where the inspection facility 60 collects partial measurements from three nodes b, c and i, each equipped with a respective traffic anomaly detector 50. It is to be noted that the additional equipment and applications to be installed at these nodes is minimal, so that it is easy to equip a large number of nodes with the anomalies detectors of the invention.

The traffic anomalies detector is based on infrequent, periodic sampling. The anomalies detection is estimated over a time window T, which is configurable by the network operator: each node may use a different time window for collecting the measurements, according to its operating parameters. Also configurable is the number of destinations with the largest fan-in supervised; the repeat offenders may be defined using a "repeat offender" threshold, as seen later. For example, each node may assemble a list 20 (see FIG. 2), identifying ten (m=10) "repeat offenders" over the last five minutes (T=5 mm). This list may be automatically provided to the inspection facility 60 for further analysis.

Figure 2:
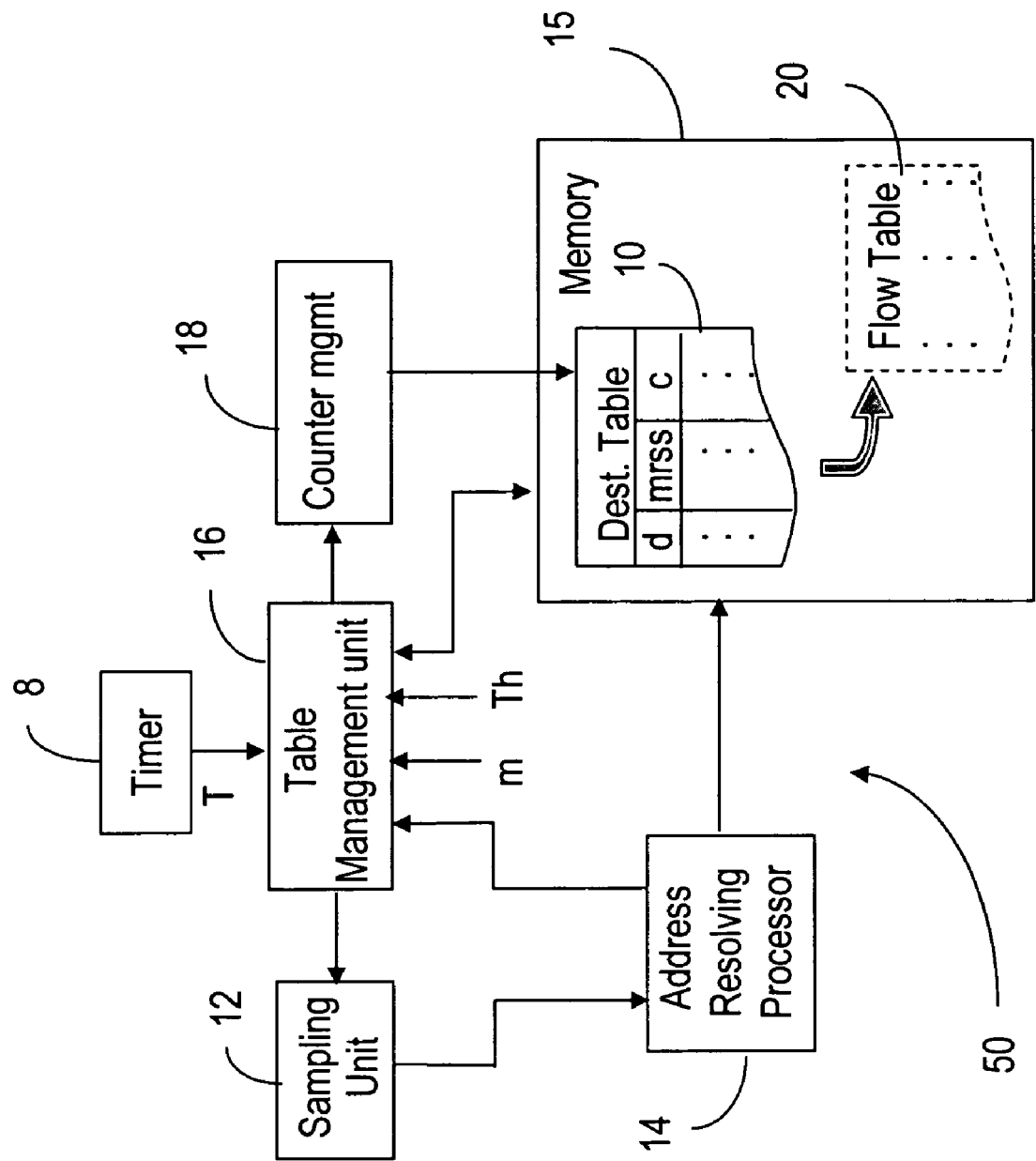
FIG. 2 illustrates a block diagram of a traffic anomaly detector according to an embodiment of the invention.

FIG. 2 shows the block diagram of the traffic anomalies detector according to an embodiment of the invention. Traffic anomaly detector 50 includes a sampling unit 12, an address resolving processor 14, a table management unit 16, a counter manager 18 and a memory 15. The messages are sampled over a time window, configurable using a timer 8.

For fan-in observation, memory 15 maintains two data structures, namely a destinations table 10 and optionally, a flow table 20. The destinations table 10 has one row for each expected destination, and three columns: a first column identifies the destination d of the sample, a second column identifies the most recently seen source (mrss) for the respective destination, also referred to as the previous source, and a counter column (c) that provides an approximation to the number of sources that have the same destination. For fan-out observation, a sources table 10' (not shown) is used, which has one row for each expected source, and three columns: a first column identifies the source s of the sample, a second column identifies the most recently seen destination (mrsd) for the respective source, and the counter column (c) that provides an approximation to the number of destination that have the same source.

Preferably, the table 10 is implemented with a hash table, where each destination/source address for every message m(s,d) observed by the anomalies detector is associated to the record in table 10 with index H(d) for the selected hash function. The size |HT| of the destinations table 10 is much smaller than the number N of network nodes. A hash table is used for memory savings; a table with as many rows as there are possible IP addresses, would be huge and difficult to maintain. Other data structures may be equally used, the invention not being limited to keeping the destination information in hash tables. In any case, The flow table 20 is optionally provided for tracking the address of the nodes with a potentially large fan-in/fan-out. A destination/source address is included in this table if the count in table 10 is larger than the configurable threshold Th.

Sampling unit 12 collects every $n^{th}$ packet arriving at the observation point i and provides it to the address resolving processor 14. Experiments show that good results are obtained when between e.g. 1,000 and 5,000 packets have been sampled. Results were considered "good" when confirmed using known malware detecting algorithm methods, such as these described by Xu et al., in "Joint Data Streaming And Sampling Techniques For Detection Of Super Sources And Destinations", Technical Report, College of Computing, Georgia Institute of Technology, July 2005, and by Flajolet and Martin, in "Probabilistic Count Algorithm For Data Base Applications", Journal Of Computer And System Sciences, 31(2):182-209, October 1985.

This experimental observation may be used to configure the duration of the time window T. For example, at a traffic rate of 1 Gbps, assuming 576B packets and a 1:8192 sampling rate, 5,000 packets would be available every 188 seconds (5000×8192×576×8/1000000000). In many cases, good results are obtained after only 1,000 packets have been sampled.

In real life most of the packets are actually very small (i.e. about 64 bytes. An operator would have to tune this parameter to his choice of accuracy vs. timeliness based on his experience and requirements. In addition, as this is intended as the 'first line of defense', a little inaccuracy in the results can be accepted, because it would likely be used to identify nodes that are consistently misbehaving, and then these nodes would be subject to further analysis (via DPI or other methods.) As a practical example, the operator would use the anomalies detector in an initial configuration, let's say for a traffic rate of 1 Gbps, 1:8192 sampling rate, T=3 minutes. Then, if the system as a whole is providing the measurements too slowly, the operator would change the T to two minutes, at a cost of decreased accuracy.

Returning now to FIG. 2, processor 14 analyzes the packet header of the sampled packets in order to determine the source and destination addresses, and stores the destination address in table 10, if this address is not already in the table. If the destination address is already in the table, address resolving processor 14 checks if the most recently seen source (mrss) for that destination is the same as the source of the current packet. If yes, then the record for that destination remains unchanged. If mrss for the respective destination is different, then processor 14 changes the mrss for that record to be the source of the current packet. When the mrss field in the destinations table is changed, counter management 18 increments the value kept in the third column of table 10.

Table management unit 16 performs management of the data in the tables, such as table initialization at start-up, initialization of the counters after expiration of the time window T and also performs general control functions for the traffic anomalies detector 50. Table management unit 16 also initiates transfer of data from destinations table 10 into flow table 20, by selecting the destinations with a counter higher than threshold Th. The number m of records transferred from table 10 into table 20 is configurable. As indicated above, this option may be used if it is desired to keep the information about the offenders at the node. The address resolving processor 14 at the node is also capable of clear certain of the repeat offenders form the list. For example, the repeat offenders may be analyzed locally and determined to be legitimate, and thus exempt from further analysis.

Preferably, once the window T has ended, all the information in the destinations table 10 is transmitted to the table management unit 16, that inserts the table and other related information (such as date and time, node location, etc) into more complex tables to be further analyzed by humans, or various monitoring systems in an NMS. Table 10 with the additional related information may be sent to the inspection facility 60 at the end of every time window T, or just the flow table 20 with the related information may be sent to the inspection facility 60 at regular intervals of time.

Figure 3:
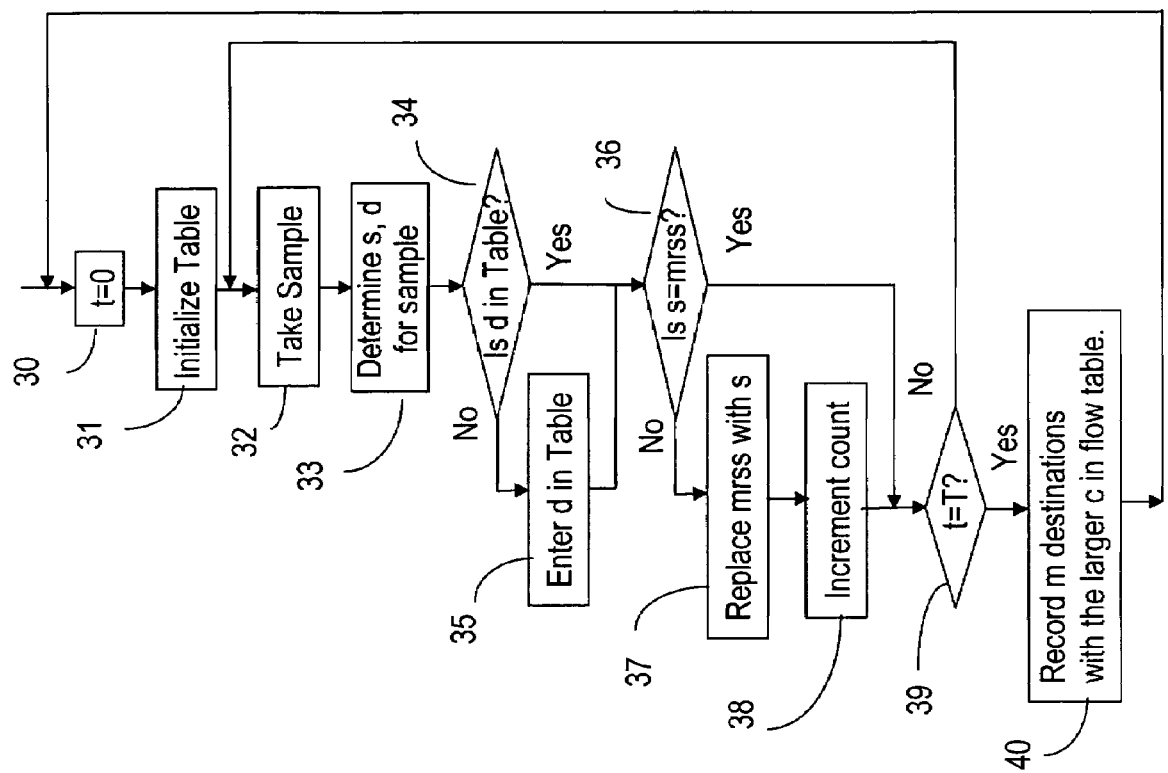
FIG. 3 illustrates a flow chart of the traffic anomalies detection method of the invention.

FIG. 3 illustrates a flow chart of the traffic anomalies detection method of the invention. Initially, at time t=0 shown in step 30, the destination (d) and most recently seen source (mrss) columns of destinations table 10 are initialized to null, and the counter column (c) is set to all zeroes, step 31. Upon arrival of a sampled packet, step 32, the address resolving processor 14 identifies the destination and source addresses of the sample, step 33 and then checks to see if the destination d is in the table. If d is not in table 10, as shown by branch "N" of decision block 34, this new destination is added into the table in step 35.

Next, the address resolving processor 14 check to see if the most recently seen source mrss for destination d is the same as the source of the current packet. If it is different, as shown by branch "No" of decision block 36, the address in the most recently seen source for destination d is set to be the same as the source of the current packet, step 37. The counter c for this destination is incremented, step 38 to show that an additional packet was collected from the flow destined to d. We note that the value in counter will be greater than the actual fan-in of the destination, but experiments have shown that the ordering is approximately the same as that of the actual fan-in. If, on the other hand s=mrss, branch "No" of decision block 36, the counter management unit 18 leaves c unchanged.

At the end of the time window, as shown by block 39, m (say m=10) records for the destinations with the largest value in the counter column are stored in the flow table 20, step 40, and the time table 10 is emptied, step 31. If t<T, branch "No" of decision block 39 the next sample is collected by the sampling unit 12 and processed as described above.

Results of an experiment effected with the anomalies detector on a trace of 100 k packets with approximately 25 k nodes is provided next. The experiment was run on a trace from the University of Memphis' OC-3c link to Abilene's KSCY (Kansas City). The mixture of packet sizes was typical for the Internet, with roughly 50% of the packets size being 64 B long, 25% being 1500 B, and an average packet size of approximately 500 B. Roughly 25,000 distinct addresses were represented in the trace, which has about 100,000 packets. A sampling rate of 1:100 was used. At such a bandwidth, the trace would have represented about 2.5 seconds, but typical utilization on this link is roughly 10%, thus the trace was over (about) 25 seconds.

The detector returned the top ten fan-out counts. Then the trace was analyzed by looking at every packet, and the actual top-ten fan-outs were noted. The two lists agreed on nine candidates shown in the table below.

TABLE 1

Estimated fan-outs for the top ten repeated offenders

| Estimated Fan-out | Source address |
|---|---|
| 113 | 3887254 |
| 83 | 65538 |
| 69 | 995137209 |
| 67 | 1157627944 |
| 63 | 995137211 |
| 56 | 995137210 |
| 55 | 1157628456 |
| 55 | 131074 |
| 55 | 995137212 |

Further experiments have indicated that what is most significant for accuracy is the number of packets sampled. Thus, trade-offs of sampling rate vs. utilization vs. time window, may be used advantageously.

As an example, the fan-out of each source address was measured at a particular router on the two dates Jul. 11, 2001 and Jul. 13, 2001 using the anomalies detector of the invention. If the source address (converted to integer, rather than the normal four byte representation) is plotted on a horizontal axis, the vertical axis is represents the fan-out as measured by this method. A horizontal line is would indicate a 'normal' maximum fan-out that would be expected, and may be obtained by observing the maximum fan-out over many days. Fan-outs that are abnormally high as compared with previous days may be detected. The addresses corresponding to these abnormally high fan-outs are determined from the horizontal axis, and then further investigation of what was happening with these addresses can take place. When the method was run on real traces from Jul. 11, 2001 and Jul. 13, 2001, an anomaly was caught due to the release of the famous "Code Red" worm.

I claim:

1. A method performed by an anomalies detector for tracking anomalous activity in a data packet network, the method comprising:
   sampling, at the anomalies detector, over a predetermined time window a number of sampled packets, for determining a packet source address (PSA) and a packet destination address (PDA) of each said sampled packet; and
   determining at least one of:
      a fan-in count for said PDA by incrementing a counter for said PDA whenever said PSA of said sampled packet is not the same as a most recently seen source address (MRSS) for said PDA, and
      a fan-out count for said PSA by incrementing a counter for said PSA whenever said PDA of said sampled packet is not the same as a most recently seen destination address (MRSD) for said PSA.

2. The method of claim 1, further comprising, when said fan-in count is determined, identifying at the end of said time window if any of said destination addresses is a target destination address for an anomalous activity if said respective fan-in count is abnormally large with respect to a preset threshold.

3. The method of claim 2, further comprising:
   providing a plurality of observation points throughout said network; and
   generating at each said observation point a list with partial fan-in counts for a specified number of target destination addresses.

4. The method of claim 3, further comprising:
   automatically transmitting said list from each said observation point to an inspection facility at the end of said time window; and
   at said inspection facility, for each target destination address, determining an estimated value of the total number of packets Fanin(d) destined to said target destination address by aggregating said partial fan-in counts that have said target destination address.

5. The method of claim 1, further comprising, when said fan-out count is determined, identifying at the end of said time window if any of said source addresses is an origin of anomalous activity if said respective fan-out count is abnormally large with respect to a preset threshold.

6. The method of claim 5, further comprising:
   providing a plurality of observation points throughout said network; and
   generating at each said observation point a list with partial fan-out counts for a specified number of suspect source addresses.

7. The method of claim 6, further comprising:
   automatically transmitting said list from each said observation point to an inspection facility at the end of said time window; and
   at said inspection facility, for each suspect source address, determining an estimated value of a total number of packets transmitted from said suspect source address by aggregating said partial fan-out counts that have said suspect source address.

8. A traffic anomalies detector for tracking anomalous activity in a data packet network, the detector comprising:

a sampling unit that samples a number of sampled packets seen by said detector over a predetermined time window;

a storing means that maintains at least one of:
- a fan-in count and a most recently seen source address (MRSS) for at least one observed destination address, and
- a fan-out count and a most recently seen destination address (MRSD) for at least one observed source address; and an address resolving processor that determines a packet source address (PSA) and a packet destination address (PDA) of each said sampled packet and performs at least one of:
- when said storing means maintains a fan-in count and an MRSS for said PDA, setting said MRSS equal to said PSA whenever said PSA is not the same as said MRSS, and
- when said storing means maintains a fan-out count and an MRSD for said PSA, setting said MRSD equal to said PDA whenever said PDA is not the same as said MRSD.

9. The detector of claim 8 further comprising a timer for setting said predetermined time window.

10. The detector of claim 8, wherein said fan-in count is provided as a destinations table comprising:
- one row for each destination address identified by said address resolving processor;
- a first column identifying the destination address of each sampled packet;
- a second column identifying the most recently seen source address for the respective destination address in the first column; and
- a counter column that provides an approximation to the number of source addresses that have said destination address in said first column.

11. The detector of claim 10, wherein said destinations table is implemented with a hash table, where each destination address is associated to a row with an index H(d) for the selected hash function.

12. The detector of claim 8, further comprising a table management unit for identifying at the end of said time window if any of said destination addresses is a target destination address for any anomalous activity.

13. The detector of claim 8 further comprising a counter management unit for updating said fan-in count whenever said most recently seen source address corresponding to said destination address changes.

14. The detector of claim 8, wherein said fan-out count is provided as a sources table comprising:
- one row for each source address identified by said address resolving processor;
- a first column identifying the source of each sampled packet;
- a second column identifying the most recently seen destination address for the respective source address in the first column; and
- a counter column that provides an approximation to the number of destination addresses that have said source address in said first column.

15. The detector of claim 14, wherein said sources table is implemented with a hash table, where each source address is associated to a row with an index H(d) for the selected hash function.

16. The detector of claim 14, further comprising a table management unit for identifying at the end of said time window if any of said source addresses is transmitting malware traffic.

17. The detector of claim 14 further comprising a counter management unit for updating said fan-out count whenever said most recently seen destination address corresponding to said destination address changes.

* * * * *